July 11, 1950
K. W. THOMSON
2,514,683
FILM TENSIONING DEVICE
Filed April 6, 1948
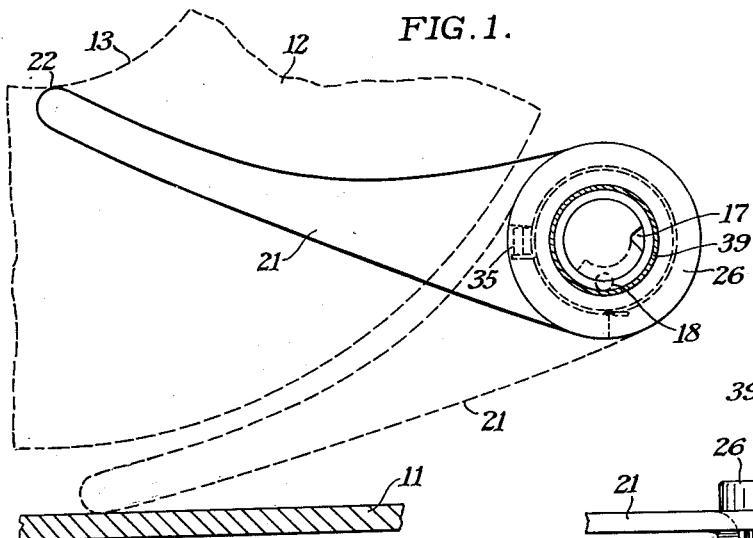
FIG. 1.
FIG. 4.
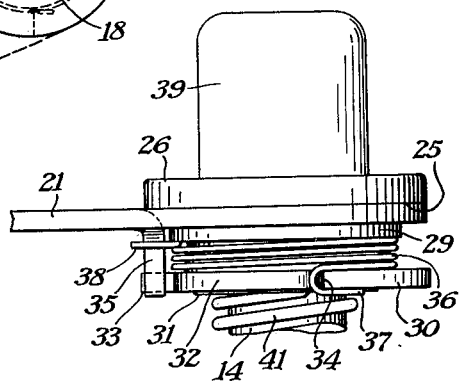
FIG. 5.
FIG. 6.
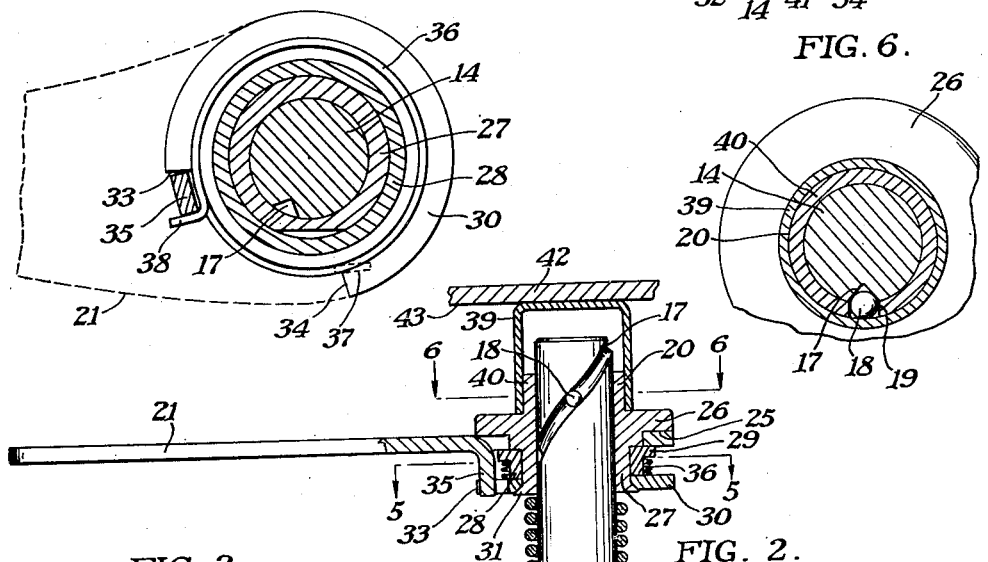
FIG. 3.
FIG. 2.
KENNETH W. THOMSON
INVENTOR
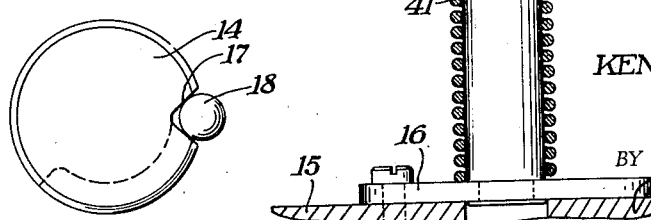
BY
ATTORNEYS Patented July 11, 1950

2,514,683

UNITED STATES PATENT OFFICE 2,514,683

FILM TENSIONING DEVICE

Kenneth W. Thomson, Rochester, N. Y., assignor to Eastman Kodak Company, Rochester, N. Y., a corporation of New Jersey Application April 6, 1948, Serial No. 19,310

6 Claims. (Cl. 242—71)

The present invention relates to cameras, and more particularly to a film tensioning device for the take-up spool or reel of a motion-picture camera.

As is well known to those in the art, motion-picture film is provided with a trailing strip which is wound on to the take-up spool or reel in several convolutions to protect the exposed portion of the film. It is also known that after the film has been wound, any jarring of the camera may tend to clock-spring the film on the spool to unwind or loosen the latter so that the trailing strip may no longer be effective to protect the exposed portion of the film.

In order to overcome this disadvantage, the present invention provides a device which applies a slight amount of tension on the film strip as the latter is being wound up on the take-up spool. In addition, this device securely holds the film in wound condition and effectively prevents clock-springing thereof when the camera is subjected to jarring, thus effectively protecting the previously exposed portion of the film. However, when the camera cover is opened, the tensioning device is moved automatically to an inoperative but retractive position to permit free and easy removal of the take-up spool.

To these and other ends, the invention resides in certain improvements and combinations of parts, all as will be hereinafter more fully described, the novel features being pointed out in the claims at the end of the specification.

In the drawings:

Fig. 1 is a plan of a portion of a motion-picture camera, with the cover removed, showing the relation thereto of the tensioning device of the present invention;

Fig. 2 is a side elevation view, with parts and sections, showing the arrangement of the various elements of the tensioning device of the present invention;

Fig. 3 is a top view of the supporting post, showing the extent of the spiral groove therein;

Fig. 4 is a side elevation view of the upper part of the tensioning device, showing the relation of the tensioning arm and the operating spring therefor;

Fig. 5 is a transverse sectional view of the mechanism illustrated in Fig. 2 and taken substantially on line 5—5 thereof and on a larger scale, showing the connection between the sleeve and the arm; and Fig. 6 is a sectional view taken substantially on line 6—6 of Fig. 2, showing the relation of the ball to the spiral groove in the post.

Similar reference numerals in the different views indicate the same parts.

Fig. 1 of the drawings shows a portion of one of the side walls 11 of the camera casing which houses a film take-up spool or reel 12 of well known construction having a central hub or core 13 on which the film strip is wound in the form of a coil, as is well known. A tensioning device, to be later more fully described, is provided with a spring-pressed finger or arm which yieldably engages the outer convolution of the film coil to provide a tightly-wound coil. When the film has been fully exposed and wound up on the take-up spool, the spring-pressed arm engages the trailing strip to hold the entire coil against clock-springing which might normally result from jarring of the camera. Thus, the exposed portion of the film is fully protected when the film is in a completely wound-up position. When, however, the camera cover is opened, the film tensioning arm is moved automatically to an inoperative or retractive position to permit the removal of a full spool and the substitution of an empty one therefor. The replacement of the camera cover then serves to move the arm automatically into a yielding bearing relation with the film being wound on the hub 13. As the coil of the film increases in size, the arm moves outwardly so as always to remain in engaging relation with the outer film convolution being wound upon the spool.

The tensioning device of the present invention is carried by an upstanding post 14 fixedly secured to a wall 15 of the camera casing by means of a flange 16, as best shown in Fig. 2. The upper end of the post is formed with a downwardly extending spiral groove 17 in which is positioned a ball 18 secured in place in a small hole 19 formed in a bushing or sleeve 20 loosely mounted on the upper end of the post 14, as shown in Fig. 2. The ball 18 and groove 17 thus provide, in effect, a threaded connection between the post 14 and the sleeve so that rotation of the latter relative to the post is accompanied by a simultaneous axial movement along the post, as is deemed apparent from an inspection of Fig. 2. Thus, the sleeve 20 simultaneously rotates about and moves axially relative to the post, for reasons to be later described.

The sleeve 20 has loosely mounted thereon a radially projecting finger or arm 21, the outer or free end 22 of which is positioned to engage the film coil on the hub, as shown in full line in Fig. 1. The arm 21 engages the under surface 25 of a flange 26 formed on the sleeve 20. The latter is provided with a tubular depending skirt portion 27 on which is mounted a bushing 28 formed with a radial flange 29 which cooperates with the flange 26 to position the arm 21 relative to the sleeve 20, as clearly shown in Fig. 2. A plate 30 is positioned on the skirt 27 just below portion 28, see Fig. 2, and is held in place by swedging over the lower end of the sleeve 20, as shown in 31. The sleeve 20, bushing 28 and plate 30 thus form, in effect, a single member loosely mounted on the post. However, for manufacturing reasons and to permit the positioning of the arm 21 on the sleeve, it is preferred to make these parts as separate units and then connect them together, as shown in Fig. 2.

The periphery of plate 30 has a portion 32 that is removed or cut away therefrom to provide a pair of circumferentially spaced shoulders 33 and 34 between which a depending lug 35 on the arm 21 is positioned. A coil spring 36 is wrapped around the bushing 28 and has one end 37 anchored to the shoulder 34 while the other end 38 is secured to the lug 35. The spring 36 is wrapped so as to tend to rotate the arm 21 in a clockwise direction relative to the sleeve 20 as viewed in Figs. 1 and 5, so as to maintain the end 22 in yielding bearing relation with the coil of film being wound on hub 13. A cap 39 fits over an upwardly projecting tubular portion 40 of the sleeve 20 and is supported on the flange 26 thereof, as best shown in Fig. 2. The hole 19 in which the ball 18 is positioned is formed in the portion 40 which is covered by the cap 39 so that the latter serves to prevent the ball from dropping out of the hole, as will be apparent from an inspection of Fig. 6. The above-described mechanism rests on the upper end of and is supported by a coil spring 41 which surrounds and is concentric with the post 14 and is, in turn, supported by the flange 16, all of which is shown in Fig. 2.

With the parts thus described arranged in a manner as shown in Fig. 1, the operation thereof will now be explained. When the film has been exposed, and the full film spool 12 is to be removed, the camera cover, a portion 42 of which is shown in Fig. 2, is removed. The spring 41, which is under compression, as will be later explained, expands and acts on the lower end of the skirt 28 to move the latter upwardly and axially along the post 14. However, due to the ball and groove connections 18 and 17, such upward movement is accompanied with a counter-clockwise rotation or turning of the sleeve 20, as viewed in Figs. 1 and 5. Such turning finally brings the shoulder 33 of the plate 30 into engagement with the depending lug 35 of arm 21 to pick up the latter and move it as a unit with the sleeve 20 until the free end 22 of the arm finally engages the wall 11 of the camera casing as shown by the dotted lines in Fig. 1. Such engagement occurs just before the ball 18 reaches the upper end of the groove 17 so that the ball is never completely withdrawn therefrom, the advantage of which is deemed obvious. When the end 22 of the arm 21 engages the wall 15, the arm is moved clear of the reel, as shown in Fig. 1, so that the full spool may be withdrawn and replaced with an empty spool.

When the empty spool has been properly positioned in the camera, the cover 42 is then closed. Such closing will cause the under surface 43 of the cover to engage the cap 39 to press the sleeve 20, arm 21 and associated parts downwardly against the action of the spring 41 to compress the latter. Due to the ball and groove connection, this downward movement of the sleeve simultaneously imparts a clockwise rotation thereto to move the shoulder 33 out of holding relation with the lug 35 to free the arm 21. The latter then moves in a clockwise direction, under the action of the tension spring 36, to move the free end 22 into engagement with the film being coiled on the hub 13, as shown in full line in Fig. 1. As the size of the coil increases, the free end 22 moves outwardly to rotate the arm in a clockwise direction relative to the sleeve 20 which remains stationary. This counter-clockwise movement of the arm 21 serves to wind up or tension the spring 36. When the film is completely exposed and is wound, together with the trailing strip, on the spool 12, the free end 22 of the arm is held yieldably, by reason of the tension spring 36, in contact with the outer convolution of the trailing strip. Such engagement securely retains the film in a wound condition even when the camera is jarred. Then, when the spool is to be removed, the cover is lifted, thus releasing the spring 41 which serves to move the part upwardly in a counter-clockwise direction to move the shoulder 33 towards the lug 35 to finally engage and pick up the latter to thus turn the sleeve and arm as a unit until the latter reaches the position shown as dotted lines in Fig. 1.

The present invention thus provides an arrangement for tensioning the film as it is being wound on the take-up spool, and also effectively prevents clock-springing of the wound coil of the film. The movement of the elements is controlled, in part, by the camera cover.

While one embodiment of the invention has been disclosed, it is to be understood that the invention idea may be carried out in a number of ways. This application is, therefore, not to be limited to the precise details described, but is intended to cover all variations and modifications thereof falling within the scope of the appended claims.

Having thus described my invention, what I claim is:

1. In a camera film-tensioning device, the combination with a camera casing adapted to house a film spool and provided with a cover for closing said casing, of a fixed post positioned in said casing adjacent said spool, a film-tensioning arm loosely mounted on said post, means operatively connected to said arm and tending to move said arm relative to said post and into bearing relation with a coil of film on said spool, means for holding said arm out of contact with said film when said cover is opened, and means actuated by said cover when in the closed position for moving said holding means out of contact with said arm to free the latter.

2. In a camera film-tensioning device, the combination with a camera casing adapted to house a film spool and provided with a cover for closing said casing, of a fixed post positioned in said casing adjacent said spool, a film-tensioning arm loosely mounted on said post, means operatively connected to said arm and tending to move said arm relative to said post and into bearing relation with a coil of film on said spool, a member rotatably mounted on said post, means for rotating said member in one direction and into contact with said arm to hold the latter out of contact with said film when said cover is in open position, and a connection between said member and cover to rotate said member in the opposite direction and out of contact with said arm when said cover is closed to free said arm for moving into engagement with said film.

3. In a camera film-tensioning device, the combination with a camera casing adapted to house a film spool and provided with a cover for closing said casing, of a fixed post positioned in said casing adjacent said spool, a sleeve loosely mounted on said post, a film-tensioning arm loosely mounted on said sleeve, means carried by said sleeve and engaging said arm and tending to move the latter relative to said sleeve and into bearing relation with a coil of film in said spool, means for connecting said sleeve to said post for axial and rotative movement thereon, a lug carried by said sleeve, means for rotating said sleeve in one direction on said post when said cover is in open position to bring said lug into engagement with said arm to shift and hold the latter out of engagement with said film, and means actuated by the closing of said cover to rotate said sleeve in the opposite direction on said post to move said lug out of contact with said arm to free the latter for movement into contact with said film.

4. In a camera film-tensioning device, the combination with a camera casing adapted to house a film spool and provided with a cover for closing said casing, of a fixed post positioned in said casing adjacent said spool, a sleeve loosely mounted on said post, a film-tensioning arm loosely mounted on said sleeve, a spring carried by said sleeve and connected to said arm and tending to move the latter in one direction relative to said sleeve and into bearing relation with a coil of film on said spool, means for connecting said sleeve to said post for axial and rotative movement thereon, a radially projecting lug formed on said sleeve, means for positioning said sleeve axially relative to said post, spring means engaging said sleeve to rotate the latter in one direction when the cover is in open position to bring said lug into engagement with said arm to rotate the latter as a unit with said sleeve to shift the arm out of engagement with said film, and a connection between said sleeve and cover whereby the closing of the cover serves to rotate said sleeve in the opposite direction to shift said lug out of contact with said arm to free the latter, said first spring then being rendered effective to move said arm into bearing relation with said coil of film.

5. In a camera film-tensioning device, the combination with a camera casing adapted to house a film spool and provided with a cover for closing said casing, of a fixed post positioned in said casing adjacent said spool, a sleeve loosely mounted on said post, a film-tensioning arm loosely mounted on said sleeve, a spring carried by said sleeve and connected to said arm and tending to move the latter in one direction relative to said sleeve and into bearing relation with a coil of film on said spool, a single threaded connection between said sleeve and post for connecting said sleeve thereto for axial and rotative movement thereon, a radial lug carried by said sleeve, a coil spring surrounding said post to support said sleeve relative thereto and to impart an upward movement and a rotation in one direction relative to said post when said cover is in opened position to bring said lug into engagement with said arm to rotate the latter as a unit with said sleeve relative to said post to move the arm out of said bearing relation, and a cap carried by said sleeve engageable by said cover when moved to closed position to move said sleeve downwardly and simultaneously to rotate said sleeve in the opposite direction to move said lug out of engagement with said arms, said first spring then moving said arm relative to said sleeve and into said bearing relation.

6. In a camera film-tensioning device, the combination with a camera casing adapted to house a film spool and provided with a cover for closing said casing, of a fixed post positioned in said casing adjacent said spool, a sleeve loosely mounted on said post, a film-tensioning arm loosely mounted on said sleeve, a spring carried by said sleeve and connected to said arm and tending to move the latter in one direction relative to said sleeve and into bearing relation with a coil of film on said spool, said post having a spiral groove formed in the surface thereof, a ball carried by said sleeve and engaging in said groove so that rotation of said sleeve on said post will simultaneously shift said sleeve axially thereon, a depending finger formed on said arm, a radial lug carried by said sleeve, a coil spring surrounding said post and supporting said sleeve to position said ball in said groove, said coil spring serving to rotate said sleeve in one direction and to move it upwardly relative to said post when said cover is opened to bring said lug into engagement with said finger to connect said arm to said sleeve for rotation as a unit therewith to shift said arm out of contact with said film, and a cap carried by said sleeve and adapted to be engaged by said cover when the latter is moved to closed position to move said sleeve downwardly against the action of said coil spring and simultaneously to rotate said sleeve in the opposite direction to shift said lug out of contact with said finger to disconnect said sleeve from said arm to render said first spring effective to move said arm into said bearing relation.

KENNETH W. THOMSON.

REFERENCES CITED

The following references are of record in the file of this patent:

UNITED STATES PATENTS

| Number | Name | Date |
|---|---|---|
| 2,217,036 | Williams | Oct. 8, 1940 |
| 2,326,654 | Jagust | Aug. 10, 1943 |
| 2,374,038 | Ress | Apr. 17, 1945 |